May 29, 1923.

W. E. CRANE 1,457,210

APPARATUS FOR TREATING SOIL

Filed May 11, 1920

WITNESSES

J. J. L. Wright

INVENTOR

W. E. Crane

BY Victor J. Evans,

ATTORNEY

Patented May 29, 1923.

1,457,210

UNITED STATES PATENT OFFICE.

WILLIAM E. CRANE, OF OAKLAND, MARYLAND.

APPARATUS FOR TREATING SOIL.

Application filed May 11, 1920. Serial No. 380,689.

*To all whom it may concern:*

Be it known that I, WILLIAM E. CRANE, a citizen of the United States, residing at Oakland, in the county of Garrett and State of Maryland, have invented new and useful Improvements in Apparatus for Treating Soil, of which the following is a specification.

This invention relates to apparatus for treating soil.

An object of the invention is to improve the character of soil used for horticultural or agricultural purposes which consists in disintegrating the soil or reducing it to very fine particles and mixing two or more character of soils or materials together and at the time that the mixture is taking place the soil is subjected to a current of air which thoroughly aerates the same and thereby contributes to the soil the beneficial elements which the air may contain.

A further object of the invention is to provide apparatus including a wheel mounted frame upon which a cylinder is journaled for rapid rotation. The said cylinder is provided at its periphery with a series of spaced slots which carry teeth simulating those which are mounted upon the teeth of a thrashing machine cylinder. A feeder is adapted to convey the material to the cylinder and spring teeth are provided for holding the clods or lumps of the material upon the feeder at the delivery end thereof and while the said lumps are being grated or ground into fine particles by the teeth upon the cylinder. A hood is mounted upon the frame and extends over the upper portion of the cylinder and buffer plates are pivotally mounted under the hood and hang above the upper portion of the cylinder and the material is adapted to be cast against the said buffer plates and may rebound from the same and be repeatedly acted upon by the teeth of the cylinder. An elevator and conveyor is mounted upon the frame and operatively connected with the shaft of the cylinder whereby the ground and mixed material is removed from the apparatus. By reason of the fact that the slots of the cylinder are spaced from each other and the cylinder is rotated at a rapid rate of speed, approximately seven hundred revolutions per minute, a draft of air is created through the spaces between the slots and this air is also forced up through the material which is being mixed and disintegrated and consequently the material may absorb from the air those qualities or elements which will improve the soil or mixture for horticultural or agricultural purposes.

In the accompanying drawings:—

Figure 1:
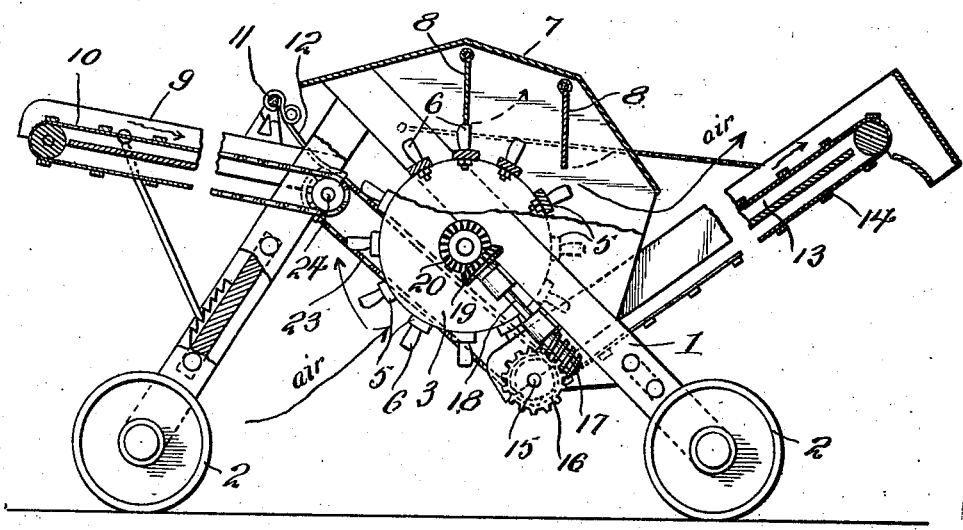
Figure 1 is a vertical sectional view of the apparatus for treating soil.
Figure 2:
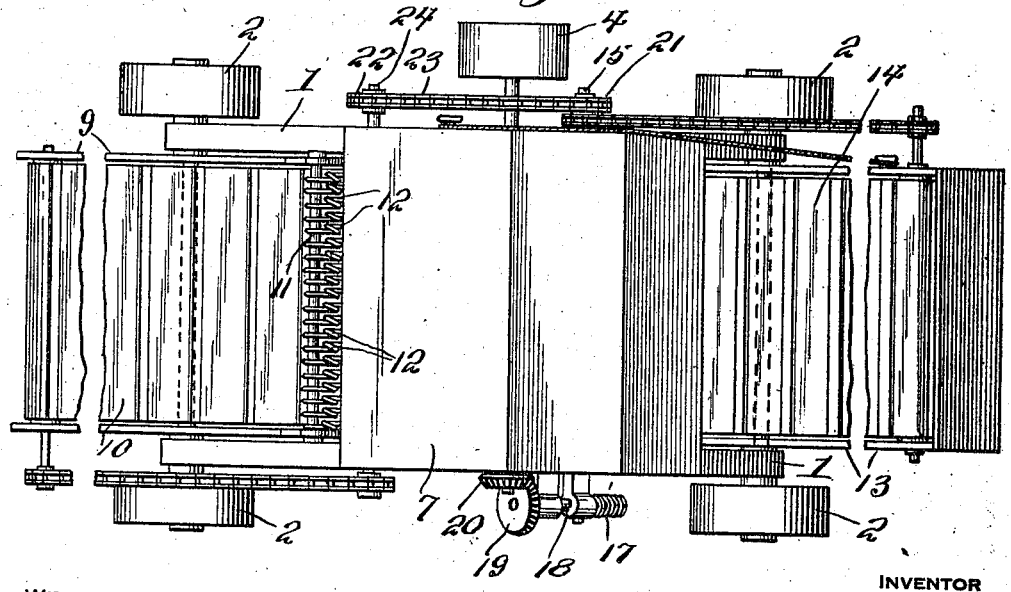
Figure 2 is a top plan view of the same.

The apparatus for treating soil comprises a V-shaped frame 1 which is mounted upon supporting wheels 2.

A cylinder 3 is journaled upon the frame 1 and its shaft is provided with a pulley 4 around which a belt may be trained for the purpose of rotating the cylinder. The said cylinder, in practice is rotated approximately at the rate of seven hundred revolutions per minute. Spaced slats 5 are mounted at the periphery of the cylinder 3 and teeth 6 are mounted upon the slats 5. The teeth 6 are approximately radially disposed with relation to the center of the cylinder 3. A hood 7 is mounted upon the frame 1 and extends over the upper portion of the cylinder 3 and the said hood is open at its opposite ends. Buffer plates 8 are pivoted under the hood 7 and hang pendent above the upper portion of the cylinder 3. The lower edges of the plates 8 lie beyond the paths of movement of the outer ends of the teeth 6. A feeder 9 is mounted upon the frame 1 and may be pitched at any desired angle with relation to a horizontal. The said feeder 9 includes an endless conveyor belt 10 which is adapted to move the material which is upon the same toward the cylinder 3. A spring pressed shaft 11 is pivoted at the upper portion of the feeder 9 and in the vicinity of the delivery end thereof and carries a series of spring teeth 12. The free ends of the teeth 12 are located at the delivery end of the feeder and are disposed toward the center of the cylinder 3. An elevator 13 is mounted upon the frame 1 and may be pitched at a desired angle with relation to a horizontal. The said elevator 13 includes a movable conveyor belt 14 the receiving run of which is located under the lower portion of the cylinder 3 and the said belt is adapted to be moved by a shaft 15 which is journaled at the lower portion of the elevator 13.

A worm wheel 16 is fixed to the shaft 15 and meshes with a worm 17 mounted on a shaft 18 which is journaled upon the frame 1. A beveled gear wheel 19 is carried at the upper end of the shaft 18 and meshes with a beveled gear wheel 20 which is mounted upon the shaft of the cylinder 3. A sprocket wheel 21 is mounted upon the shaft 15 and a sprocket wheel 22 is mounted upon a shaft 24 which actuates the feeder belt 10. A sprocket chain 23 is trained around the sprocket wheels 21 and 22 and is adapted to transmit rotary movement from the shaft 15 to the shaft 24. Through the intermeshing pinions 20 and 19, the shaft 18 and worm 17 and worm wheels 16 rotary movement is transmitted from the shaft of the cylinder 3 to the shaft 15. In operation the material to be pulverized or disintegrated and mixed is placed upon the upper run of the belt 10. The cylinder 3 is rotated at a rapid rate of speed and consequently the upper run of the belt 10 will move the material toward the cylinder under the spring teeth 12. The said teeth 12 will hold clods or other large particles of the material and prevent the same from being pushed back as they are encountered by teeth 6 of the cylinder. As the teeth 6 engages the material which is delivered to them by the upper run of the belt 10 the said material is thrown forcibly against the sides of the buffer plates 8 and may rebound from the said plates toward the teeth or the material is again encounted and cast against the next buffer plate 8. This operation is continued until the material passes completely over the cylinder 3 when it drops upon the upper run of the belt 14 and is moved along the elevator 13 and may be deposited at the delivery end thereof in the form of a pile or may be deposited in a wagon body or other receptacle provided for its reception. It is to be understood that the apparatus may be used for mixing soil of any character with material such for instance as fertilizer, sod, compost or any vegetable material which may have fertilizing qualities. During the time that the said material is being cast by the teeth on the cylinder 3 against the buffer plates 8 it is thoroughly mixed and disintegrated and by reason of the fact that the slots 5 are spaced from each other and the hood 7 extends over the upper portion of the cylinder the rapid movement of the said slots will cause a blast or draft of air to move in an upward direction through the spaces between the slots of the cylinder and then out under the lower edge of the hood 7 or that edge of the said hood toward which the slats at the upper portion of the cylinder are moving. Consequently this current of air must pass through the material as it is being disintegrated and mixed and therefore the particles of material will have an opportunity to absorb from the air any fertilizing qualities which may be contained therein. Furthermore the mixed and disintegrated material is thoroughly aerated and when it is discharged from the apparatus it is in a fine, light and fluffy condition. This material is admirably adapted to be used for floricultural, horticultural or agricultural purposes where intensive cultivation is necessary or required.

Having described the invention what is claimed is:—

1. An apparatus for treating soil comprising in combination with a frame having a rotary beater cylinder of slatted construction thereon, an open ended hood mounted over said cylinder, buffer plates depending from said hood, and means to feed material to be treated to the upper part of said cylinder along the line of the air current created beneath the hood by the rotation of said slatted cylinder.

2. An apparatus for treating soil comprising a frame, a cylinder formed of spaced slats journalled on said frame, teeth mounted on said cylinder, a hood mounted on said frame and having open ends extending beyond said cylinder, buffer plates mounted on said hood, a feeder belt, a toothed guard mounted at the delivery end of said feeder beneath the end of the hood, and means for rotating said cylinder and feeder.

3. An apparatus for treating soil comprising a frame, a slatted cylinder journalled thereon, teeth mounted on the slats of said cylinder, an open ended hood mounted over said cylinder, buffer plates depending from said hood, means to feed material to the upper part of said cylinder along the line of the air current beneath the hood created by the rotation of the cylinder between the open ends of the hood.

In testimony whereof I affix my signature.

WILLIAM E. CRANE.